United States Patent [19]

Frohbach et al.

[11] 4,261,007
[45] Apr. 7, 1981

[54] COLOR TELEVISION ENCODING AND DECODING SYSTEM

[75] Inventors: Hugh F. Frohbach, Sunnyvale; Robert E. Myers, Menlo Park; Norman A. Peppers, Belmont; Thomas L. Siwecki, Walnut Creek; Louis F. Schaefer, Palo Alto; Albert Macovski, Menlo Park, all of Calif.

[73] Assignee: Laser-File Inc., Los Angeles, Calif.

[21] Appl. No.: 45,179

[22] Filed: Jun. 4, 1979

Related U.S. Application Data

[63] Continuation of Ser. No. 820,602, Aug. 1, 1977, abandoned.

[51] Int. Cl.³ ............................................. H04N 5/88
[52] U.S. Cl. ...................................................... 358/5
[58] Field of Search ...................... 358/5, 6, 7, 44, 45; 354/100–103; 352/66, 67, 45

[56] References Cited

U.S. PATENT DOCUMENTS

| 2,733,291 | 1/1956 | Kell | 358/47 |
| 3,475,549 | 10/1969 | Goldmark et al. | 358/7 |
| 3,495,518 | 2/1970 | Takagi et al. | 358/5 |
| 3,506,778 | 4/1970 | Gold et al. | 358/5 |
| 3,510,575 | 5/1970 | Dillenburger et al. | 358/45 |
| 3,531,584 | 9/1970 | Bell | 358/5 |
| 3,591,268 | 7/1971 | Neale | 358/5 |
| 3,637,925 | 1/1972 | Flory et al. | 358/5 |
| 4,011,442 | 3/1977 | Engder et al. | 358/213 |

Primary Examiner—John C. Martin

[57] ABSTRACT

A color image is recorded on film at the television field rate with alternate film frames representing the luminance and chrominance information. The chrominance information is encoded by filtering the color image through a striped color filter. On playback two line scanners are used to simultaneously scan the luminance and chrominance frames to provide the desired information simultaneously. A decoding signal is used to decode the encoded chrominance information and derive color-difference signals.

37 Claims, 6 Drawing Figures

COLOR TELEVISION ENCODING AND DECODING SYSTEM

This is a continuation of application Ser. No. 820,602, filed Aug. 1, 1977, now abandoned.

BACKGROUND OF THE INVENTION

1. Field of the Invention

This invention relates to color television recording and playback systems. In a primary application the invention relates to the recording of encoded television information onto film and the reading out of that information in the form of color television signals. Another application of the invention relates to the photographic recording of live scenes onto a photosensitive medium in an economic fashion and with a format which can be converted into color television signals.

2. Description of Prior Art

A variety of approaches have been used for the recording and playback of color television information. These have included magnetic tape, discs, and film. Magnetic tape systems use a very expensive media. In addition, the recording process from live scenes requires a color television camera and is thus quite expensive. Disc systems have had a variety of mechanical difficulties. In addition, the home consumer cannot record live scenes on this media. Film systems thus represent an attractive approach to the recording and playback of color television information. They are both high in information density and they can be used in modified home cameras to enable home consumers to record their own material and play it back on their home color television receivers.

Existing color television encoding formats on film have various problems. Most approaches encode the color information on a very high frequency carrier. The high fequencies are used to separate the chrominance information from the high frequency portions of the luminance information. These high frequencies are difficult to resolve on the film. In addition they are difficut to resolve on the scanner when the encoded information is read out. In addition, it is difficult to keep track of the phase of high frequency carriers so that amplitude modulation of two different carriers is usually employed. A variety of cross talk can then develop between the two modulated carriers carrying the color information, and the high frequency components of the luminance signal.

One such encoding format is described in U.S. Pat. No. 3,378,633. Monochrome Photography System for Color Television, issued to A. Macovski. In this patent the red and blue information are encoded on vertical and diagonal high-frequency carriers by projecting the color image through two striped color filters at these same angles. This system requires a relatively high resolution camera to resolve the high frequency color carriers. Also, the luminance resolution must be degraded somewhat to prevent high-frequency luminance detail from appearing in the color bandpass circuits. Thus the full luminance resolution of the system is not achieved, and a relatively high-resolution scanner is required to read out the encoded color information.

One solution to this problem is the use of separate recorded frames for the luminance and chrominance information. This is done in the EVR system. The EVR system is described in a publication by Peter C. Goldmark entitled, "Color Electronics Video Recording," which appeared in the *Journal of the Society of Motion Picture and Television Engineers*, Vol. 79, August, 1970, pp. 677–686. In this system an electron beam recorder records two rows of frames on film. These include a luminance frame and a chrominance frame on which a color subcarrier is amplitude-modulated by two color difference signals in phase quadrature. This system, however, is not used for producing encoded film by the consumer, since the chrominance information is not created photographically by imaging through a striped filter as in U.S. Pat. No. 3,378,633. Thus it is suitable only for pre-recorded material. In addition, the format used makes relatively inefficient use of the storage media since each film frame is used for a single television field, or half of the information required for a television frame. The pairs of luminance and chrominance frames are recorded and played back at 60 fields/sec.

The direct photographic recording of the EVR format is described in U.S. Pat. No. 3,535,992, "Method and Apparatus for Optically Recording Color Picture Information on a Photographic Medium," issued to Peter C. Goldmark and William E. Glenn. In this patent the chrominance frame is recorded by filtering the color scene using a striped color filter. A variety of dual imaging methods are shown in this patent for simultaneously imaging the color scene onto the luminance and chrominance frames. This system has the same inefficient use of film previously described.

The system described in both U.S. Pat. No. 3,535,992 and the previously described publication on the EVR system use a fairly complex method of providing continuous synchronization signals. A half-frequency reference signal is included over the entire chrominance frame to account for scan velocity errors during playback. Existing CCD line scanners are not subject to scan velocity errors. Thus they can be used with simpler synchronization formats which can be implemented much more economically. These preferred synchronization formats are not intermixed with the color information and thus do not use up part of the dynamic range of the film. In addition, the system is much less subject to film non-linearities.

The previously described systems all used frame scanners in the readout mode consisting of television cameras or flying spot scanners. These are much more expensive than line scanners. In addition, line scanners are used with continuous film motion. This type of motion is simpler to realize without requiring the rapid pulldown often used with frame scanners.

SUMMARY OF THE INVENTION

An object of this invention is to provide a system for recording and playing back color television information using inexpensive black and white film. A further object of this invention is to efficiently use the black and white film for recording color television information. A further object of this invention is a recording format which allows direct photographic recording of a color scene. A further object of this invention is a playback system which uses inexpensive line scanners with continuous motion of the film.

Briefly, in accordance with the invention, the color information is recorded on alternate film frames representing the luminance and chrominance. The chrominance information is recorded by filtering the color image through a striped color filter. On playback two line scanners are used with continuous film motion. Switches derive the luminance output from the scanner scanning the luminance frame and the chrominance output from the scanner containing the encoded chrominance frame. The encoded chrominance information is decoded to provide the required color difference signals. The decoding signals are derived from synchronization information recorded on the side of each chrominance frame.

BRIEF DESCRIPTION OF THE DRAWINGS

For a more complete disclosure of the invention, reference may be made to the following detailed description of several illustrative embodiments thereof which is given in conjunction with the accompanying drawings, of which.

DESCRIPTION OF THE PREFERRED EMBODIMENT

Figure 1:
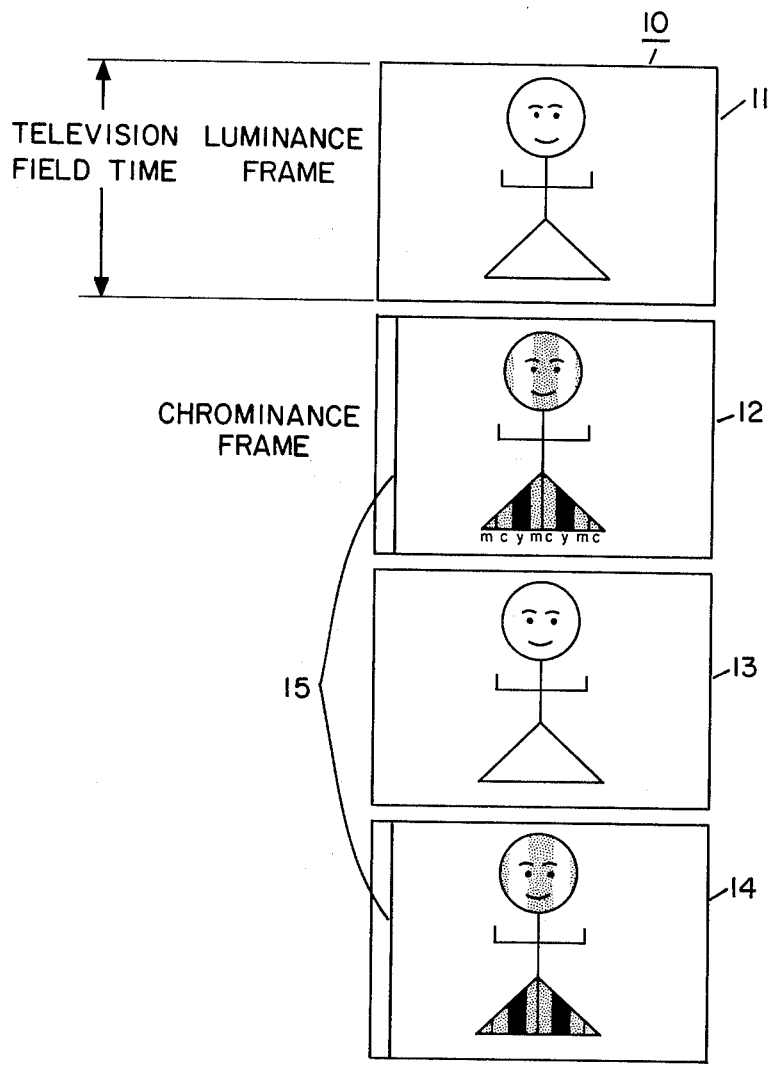
FIG. 1 is a representation of the encoded film.

An understanding of the broad aspects of the invention may best be had by reference to FIG. 1 of the drawings. FIG. 1 illustrates the stored color information ready to be played back in a manner which derives the required color television signals. The information is stored on black and white film 10. The terms "black and white" film is a generic term referring to any substrate which does not necessarily have any variation in hue. The information is thus recorded solely as variations in transmission for a transparent substrate and reflection for a reflecting substrate. Normally transparency type films are used because of their convenience in the playback mode. Silver halide emulsions are the most popular photographic film and have many desirable properties. However, a number of alternate light-sensitive systems can be used such as Diazo and Kalvar which are less expensive. These alternate films can either be used in direct recording of the data, or for making copies of a previously recorded encoded film 10. Thus the terms "black and white" can refer to a substrate material having other colors, such as are used in the blueprint process, and continue to fall under the same generic definition.

As is shown in FIG. 1 each film frame is played back in the time of a television field. In the U.S. and some other countries this corresponds to 1/60 sec. In the international standards this is 1/50 sec. Each alternate film frame 11 and 13 represents the luminance information of the scene. The remaining alternate film frames 12 and 14 represent the encoded chrominance information of the scene. Here the color information has been filtered by a striped color filter. This striped filter consists of an array of vertical stripes which selectively transmit the three primary colors; red, green and blue. Considering the reduced bandwidth requirement of the chrominance signals, and the fact that the luminance is on a separate film frame, the striped color filter can be relatively coarse and is therefore easily recorded and played back. This results in a subcarrier frequency lower than the 3.58 MHz used in the U.S. broadcast standards. One example of a striped color filter, used with the illustration in FIG. 1, is a series of stripes of the color subtractive primaries: yellow, magenta and cyan. These absorb blue, green and red respectively and transmit the other two primary colors.

In FIG. 1 the figure is assumed to have a yellow face and blue dress. The blue is absorbed by the yellow-stripe, while the yellow is partially absorbed by the magenta and cyan stripes. Thus the striped filter, which selectively absorbs the primary colors, contains all of the color information required to reproduce a full color image.

The synchronization stripe 15 marked on the side of each chrominance frame 12 and 14 is used to generate the required decoding signal to decode the chrominance information. The stripe has a fixed geometric relationship with the color stripes, and is wholly outside the color image. For example, the stripe can correspond to the position of the sequence of green stripes. Although a single stripe is shown, for improved synchronization a number of stripes can be used to provide more redundancy and a stronger synchronizing signal. The series of stripes can be at the periodicity and phase of one of the color stripes. Thus the periodicity would correspond to the repetitive period of the triad of color stripes.

Figure 2:
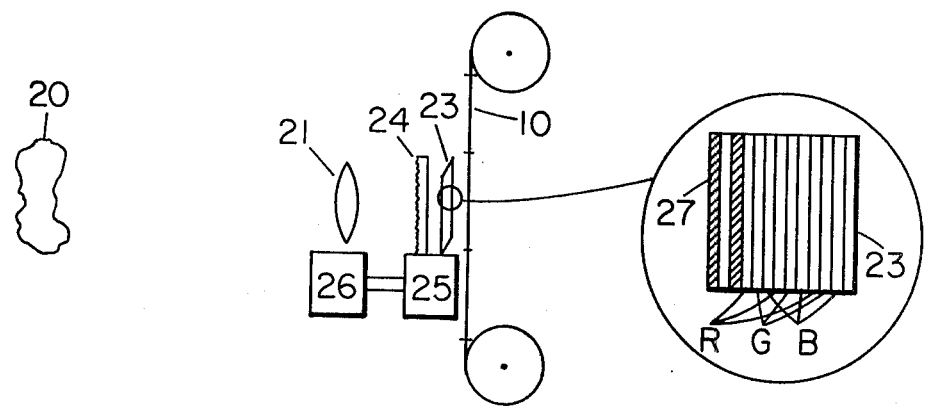
FIG. 2 is a representation of a camera system using sequential recording of the luminance and chrominance.

A camera system for producing this format is shown in FIG. 2. Here an encoded film 10, having the format shown in FIG. 1, is made using the color information from object 20. This object can either be part of a live scene, or can be a previously recorded color film. In each case the scene or color film would be appropriately illuminated. Lens 21 images colored object 20 onto the film 10. On alternate film frames the chrominance information from object 20 is recorded. This is accomplished by projecting the color information through striped filter 23. This striped filter has a series of stripes which selectively pass the color primaries. In FIG. 1 these were yellow, magenta and cyan, the subtractive or absorptive primaries. In FIG. 2, these are shown as red, green, and blue, the additive primary colors. This filter 23 is placed close enough to film 10 so that the stripes will be adequately resolved. An alternative arrangement, not shown, is to use a relay lens. Here filter 23 would be placed at an intermediate image plane and an additional relay lens used to image the striped filter 23 onto the film.

A diffuser 24 is shown placed between the lens 21 and the striped filter 23. This is to prevent high spatial frequency information from object 20 from appearing in the chrominance output. High frequency information from object 20 is not required in the chrominance frame since the chrominance bandwidth in color television is approximately 0.5 to 1.0 mhz. Thus high frequency information can only cause cross talk by generating signals similar in frequency to those of the striped color filter. The diffuser 24 prevents these components from being recorded. If desired the diffuser can be astigmatic and suppress only high frequency horizontal signals since only these can cause color cross talk. A diffuser of this type, rather than having a random rough surface, has an array of vertical structures which cause loss of resolution in one dimension only. A diffuser of this type is illustrated in U.S. Pat. No. 2,733,291, "Color Television Camera," issued to R. D. Kell. Using the astigmatic diffuser the chrominance frame can have full resolution in the vertical direction.

Alongside the striped filter 23 is the structure 27 for marking the synchronization stripe 15 shown in FIG. 1.

As shown in FIG. 2 this consists of an opaque band with a vertical transparent slit. In most cases the light from the scene will be sufficient to illuminate this slit. However, to insure that the slit is properly illuminated, in the event that the slit corresponds to a dark region of the scene, an additional source of illumination can be used. This can be a light source in the vicinity of the slit such as a small light bulb whose light is shielded from the picture portion of the frame. Alternatively an optical fiber or light pipe can be used to derive light from a defocused region of the optical system such as the vicinity of lens 21. In this manner the light used will correspond to the average light in the scene and will thus be adequate at all times.

The shutter and pulldown mechanisms in the camera are conventional and are not shown. The film 10 is advanced one film frame at the television field rate. This corresponds to 60 fields/second in the United States and 50 fields/second in some European countries. Following the exposure of the chrominance film frame, as shown in FIG. 2, the film is advanced one frame to expose a luminance frame. During this exposure the striped filter 23 and the diffuser 24 are moved out of the optical path. The two structures 23 and 24 are connected to holder 25 which is driven by motor 26. Thus, following the chrominance exposure, motor 26 is activated to turn holder 25 and clear the optical path for the direct exposure of the luminance film frame. This process is continued in sequence creating the format shown in FIG. 1.

Figure 3:
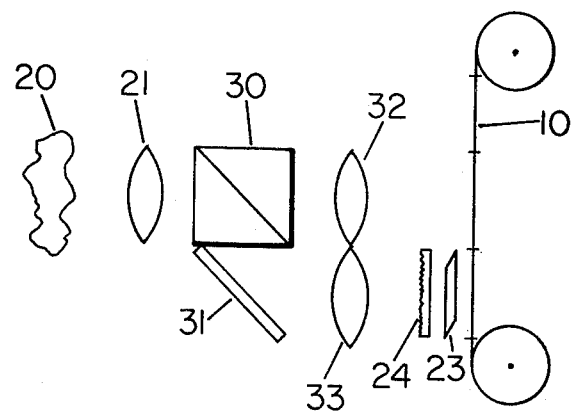
FIG. 3 is a representation of a camera system using simultaneous recording of the luminance and chrominance.
Figure 3A:
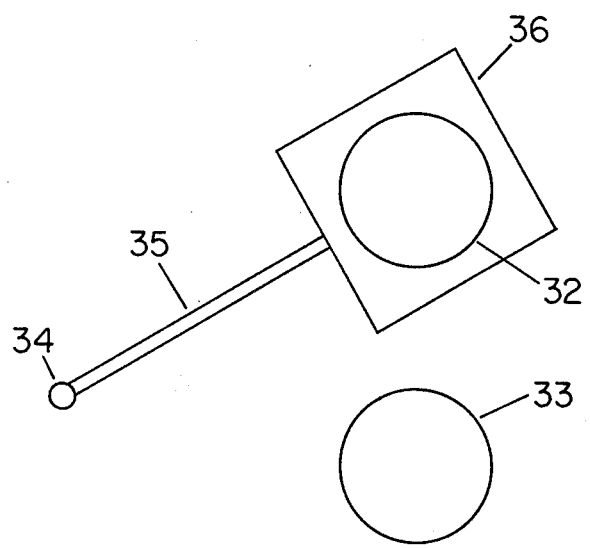
FIG. 3(a) is a modification of the system of FIG. 3.

To avoid the problem of moving the striped filter and diffuser on alternate frames, the system of FIG. 3 is used. Here the luminance and chrominance film frames are imaged simultaneously. Object 20 is imaged using lens 21 through light splitter 30 which is a partially slivered mirror which allows half of the light to pass through and half to be reflected downward. The light reflected downward is again reflected toward the film using mirror 31. Although a single lens imaging arrangement could be used, it is more convenient to use additional lenses 32 and 33 to image the luminance and chrominance frames respectively.

Lens 33, along with lens 21, images the color information from object 20 through diffuser 24 and striped filter 23. Here the imaging considerations and the filter design are identical to those described for FIG. 2 except that the diffuser and filter need not be moved. Again a relay system could be used to avoid having the striped filter 23 in contact or very close to the film. Thus the luminance and chrominance frames are imaged simultaneously.

The film, in FIG. 3, is advanced two film frames following each exposure. Thus the film is advanced at the rate of two film frames per television frame interval corresponding to two television fields. In the U.S. this corresponds to 30 television frames per second for the pair of film frames. Although the sequential system of FIG. 2 and the simultaneous system of FIG. 3 both produce the format shown in FIG. 1, the timing is somewhat different. In the sequential system the alternate film frames are taken 1/60 second apart. In the simultaneous system the alternate film frames either correspond to the same time interval or are 1/30 second apart. Using the playback system yet to be described, the simultaneous system might produce slight motion artifacts in scenes having rapid movements. This can be avoided by using the structure shown in FIG. 3-a.

The structure shown in FIG. 3-a is added to that of FIG. 3 and provides a method of sequentially blocking the luminance and chrominance paths. As shown a shutter-like device is used with an opaque paddle 36. This paddle alternately blocks luminance imaging lens 32 and chrominance imaging lens 33 at the television field rate. This can be done using a motor or actuator, not shown, which rotates shaft 34. The resultant rotational motion of arm 35 causes paddle 36 to translate between the two optical paths of the luminance and chrominance frames. During each television frame interval, 1/30 second in the U.S., the paddle 36 blocks each path for a field interval. Following each frame interval two film frames are advanced and the process is repeated. The resultant encoded images have thus been exposed sequentially at the television field rate. Thus one television field interval, 1/60 second in the U.S., is the duration between all consecutive film frames.

In the methods previously described for both the sequential and simultaneous systems of FIGS. 2 and 3, a striped filter was used in close proximity or contact with the film. In some systems this is difficult to realize since the striped filter can damage the film emulsion when it rubs against it. The system shown in FIG. 3-b solves this problem. A lenticular lens imaging system is used. In this system the striped color filter 23 is very coarse and can consist of a single triad of color filters as shown in FIG. 3-b. This system has the effect of imaging through a fine array of color stripes using the lenticular lens array 41 which is a fine array of cylindrical lenses. These lenses each focus the striped filter onto the film 10 in an imaging relationship so as to create a continuous repeating array of color stripes. If the height of the color striped filter 23 is h, and the period of the lens array is p, the imaging relationship is given by $$hd_i = pd_0$$

and $$(1/f) = (1/d_i) + (1/d_0)$$

wherein $d_i$ is the image distance, $d_0$ is the object distance and f is the focal length of the cylindrical lenslet elements. Although a single triad of color primaries is shown in FIG. 3-b, a number of consecutive triads can be used. The cylindrical lens array also acts as the desired diffuser.

This system operates best with the striped filter 23 placed in the vicinity of the imaging lens 40 since that is an out-of-focus region of the imaging optical system. The striped filter 23 can thus be placed on either side of lens 40. In the sequential system of FIG. 2 lens 40 corresponds to imaging lens 21 and the cylindrical lens 41 is mounted on holder 25 so that motor 26 can cause it to be moved away from the film during the luminance exposure. In the simultaneous system of FIG. 3 lens 40 corresponds to the chrominance imaging lens 33. In both cases the desired performance is obtained without requiring contact with the film 10 and with the added advantage of a relatively simple striped color filter 23.

Lenticular lens systems for color imaging are very well-known in the photographic and color television fields for many years. One reference for use with color television cameras is the previously referenced U.S. Pat. No. 2,733,291 of R. D Kell. In this patent one embodiment shows a lenticular lens array for imaging the colored stripes.

FIG. 3-b also shows a method of generating a synchronization stripe with the lenticular configuration. Here an additional cylindrical lens 42 is used to image structure 27, which contains a slit, onto the film 10 so that the slit image will have a fixed spatial relationship with the image of the striped filter. Since structure 27 is at an out-of-focus region of the imaging system, it should receive adequate illumination for any scene. Alternatively, as previously described, it can be separately illuminated.

Figure 3B:
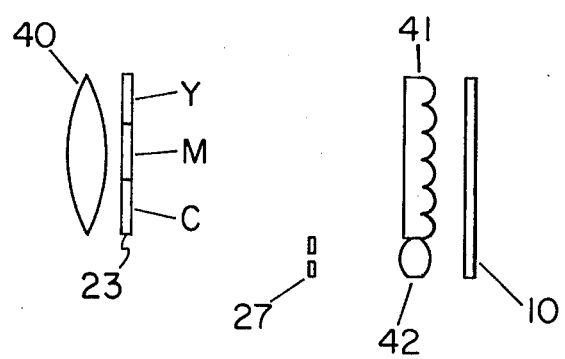
FIG. 3(b) is an alternate embodiment for encoding the chrominance information.

Although a synchronization stripe is shown in FIGS. 2 and 3, it may not always prove necessary. If the relative geometric relationship of the film and scanner on playback remains reasonably constant, the horizontal sync pulse itself can be used for color synchronization. For example in the encoding system of FIGS. 2, 3 and 3(b) the encoding filter would have a fixed relationship to the film frame. In FIGS. 2 and 3 this means that striped filter 23 is fixed with respect to film 10. In FIG. 3(b) both striped filter 23 and lens array 41 are fixed with respect to film 10. In FIG. 3(b) both striped filter 23 and lens array 41 are fixed with respect to film 10. On playback, in FIG. 4, line scanners 54 and 55 have a fixed spatial relationship to film 10. In general deflection synchronization for the horizontal and vertical deflection system on playback can be derived from an opaque region which surrounds each image. Alternatively specific horizontal and vertical sync information can be inserted in a manner similar to those shown for the color synchronization stripe. These would include a vertical stripe at the side of each image for horizontal synchronization and a marker at the top of each image for vertical synchronization. The horizontal synchronization stripe can also simultaneously serve the function of color synchronization.

A variety of striped filter configurations can be used other than the triads of the additive or subtractive color primaries as previously shown. Any three filter stripes which selectively absorb the three primary colors record all of the color information. For example two primary colors, such as red and blue, plus a neutral stripe, grey or transparent, contains all of the color information. A format of this type can make the decoding more convenient. The three stripes needn't have equal widths. The use of different widths can provide more desirable decoding formats and also compensate for different film sensitivities. Two or more sets of stripes at different angles, as is used in previously described U.S. Pat. No. 3,378,633, can also be used. Formats of this type can be decoded by simple amplitude detection of different frequency spectra without requiring a synchronized decoding signal.

An alternate approach is to encode two of the three primary colors on the chrominance frame. This can be accomplished using a striped filter having alternate stripes of two of the primary colors. In this approach the remainder of the chrominance information is derived from the luminance frame which contains a weighted sum of the three primary colors. Thus the decoded output of the chrominance frame is combined with that of the luminance frame to produce the chrominance signals. Although this approach can simplify the encoding and decoding of the chrominance frame, it has two important disadvantages. Firstly, accurate registration is required of the two frames on playback. Any misregistration will cause annoying colored edges. The registration is much less critical when all of the color information comes from one frame. The second disadvantage is the color break-up which occurs with very rapid motion since the color information is derived from frames taken one field apart. Thus the encoding of all of the color information on the chrominance frame is the more desirable approach.

Figure 4:
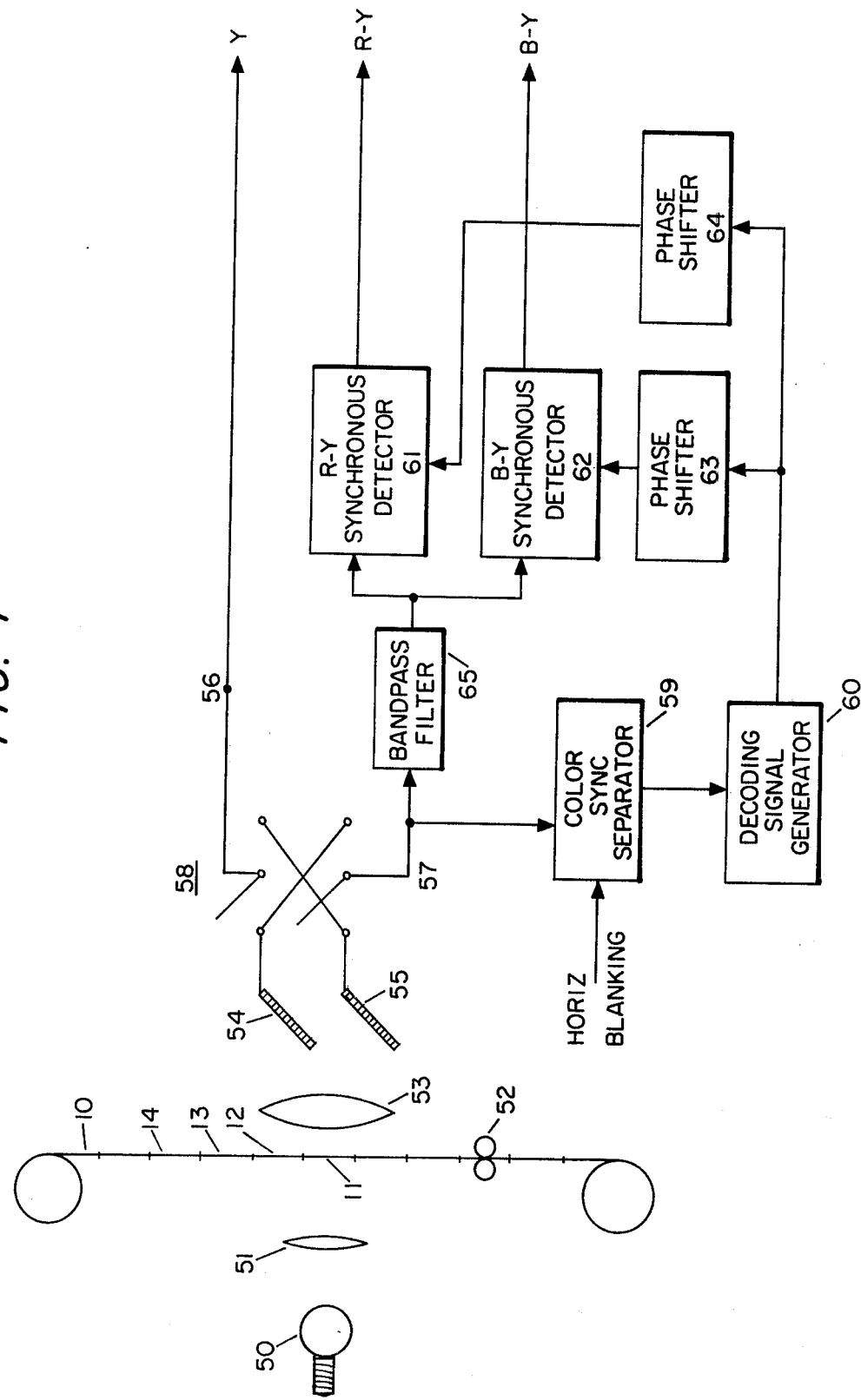
FIG. 4 is a schematic representation of the playbeck system.

An embodiment of the playback system is shown in FIG. 4. Here two line scan arrays 54 and 55 are used to read out the luminance and chrominance information from encoded film 10. The film is moved at a uniform rate by capstan 52 which advances the film at the rate of one film frame per television field time. As in FIG. 1, 11 and 13 are luminance frames and 12 and 14 are encoded chrominance frames. The film 10 is back illuminated using light source 50 and condenser lens 51. Using imaging lens 53, line scanners 54 and 55 are imaged onto film 10 with their images being one film frame apart. Thus one of the line scanners is scanning a luminance frame and the other a chrominance frame.

For example, assume line scanner 55 is imaged onto encoded chrominance frame 12 and line scanner 54 is imaged one film frame away onto luminance frame 11. Under these conditions switch 58 is thrown to the left. The Y or luminance signal is extracted from line scanner 54 and becomes the luminance output signal 56. The encoded chrominance signal 57 is derived from line scanner 55. This signal is then decoded to provide the desired color difference signals. The film is pulled along by capsten 52 until the beginning of chrominance frame 12 appears at line scanner 54 and the beginning of luminance frame 13 appears at line scanner 55. At this point switch 58 is thrown to the right to continue to provide a luminance output at 56 and an encoded chrominance output at 57. A number of mechanisms, not shown, can be used to throw electronic switch 58. It can simply be started properly at the start of the film and thrown at the end of each frame scan. Alternatively a more reliable procedure is to detect the presence of the color synchronization stripe and throw the switch such that this synchronization signal, which is only on the chrominance frame, appears at terminal 57. Another approach is to place an additional switching mark on film 10, between the luminance and chrominance frames, which provides a positive indication for throwing the switch in a particular direction.

It can be noted that each complete television frame is derived from two field scans made on each film frame. Thus chrominance frame 12 is scanned for one field interval by line scanner 55 and for a second field interval by line scanner 54. Thus, because of interlace, one field scan will provide the odd lines and the other field scan the even lines. This is true for each luminance and chrominance film frame.

The nature of the encoded chrominance signal 57 depends on the specific type of color encoding striped filter 23 which is used. In a preferred embodiment this filter is a series of red, green and blue triads as in FIG. 2. In this case the color information can be decoded by first deriving a reference signal. This reference or decoding signal can be derived by gating out the signal corresponding to the scanning of the synchronization stripe 15. As shown in FIG. 4 the horizontal blanking signal, derived from the deflection circuits, can be appropriately delayed and shaped to correspond to the time of the color synchronization stripe. The gated stripe is then used to initiate a repetitive signal at a pre-determined frequency based on the frequency of the color stripes. This repetetive signal forms the decoding signal. It can be phase-shifted, or delayed, so as to correspond to any of the colors. One decoding procedure is to use three sample-and-hold circuits, each driven by an appropriately delayed decoding signal, and to produce a red, green, and blue output signal. The color signals can be applied to a standard matrix operation to produce the required color difference signals.

To use horizontal sync information for color synchronization, once the spatial relationships have been established, the connection between the chrominance signal 57 and th color sync separator 59 in FIG. 4 is not needed. The horizontal blanking or synchronization pulse can operate the decoding signal generator 60 directly or through the color sync separator 59. The use of horizontal sync for color synchronization provides a simpler system, although the use of color synchronization stripe 15 does provide immunity to relative horizontal motion of the film.

A preferred decoding arrangement is shown in FIG. 4. Here the encoded signal 57 is passed through bandpass filter 65 which is centered at the color repetetion frequency. It then appears very similar to the conventional color subcarrier which is amplitude-modulated by color difference signals of different phases. The frequency of the color subcarrier is determined by the repetetion frequency of the color triads on striped filter 23. The phases depend on the positions of the color stripes. For example, assume equal width red, green and blue stripes are used in the striped filter. In that case the R-Y and B-Y color difference signal will be 120° apart. The separated color sync signal from separator 59 is applied to decoding signal generator 60 which generates a repetetive signal in the proper phase relationship. This signal is appropriately phase shifted by phase shifters 63 and 64 to produce decoding signals in the proper phases to decode the color difference signals. For the previous example these decoding signals from phase shifters 63 and 64 are 120° apart. They are applied to two synchronous detectors 61 and 62 which are identical to those widely used in color television receivers. They are essentially product detectors which respond to the product of the decoding signal and the encoded chrominance signal. This product is the desired color difference signals R-Y and B-Y. Using different colors of different widths on striped filter 23 results in color difference signals at different phase relationships.

These decoded color difference signals can be applied directly, along with the luminance signal, to color television receivers or monitors. Alternatively the color difference signals can be used to modulate a carrier at 3.58 mhz, corresponding to the frequency of the color television subcarrier. The appropriately modulated subcarrier, plus the Y signal form a composite color video signal. This can be used to modulate a carrier at the frequency of one of the television channels. In this way the resultant signal can be applied directly to the antenna terminals of a color television receiver so as to playback home-recorded or pre-recorded material.

The line scanners shown, 54 and 55, are preferably an array of photosensitive elements which are read out serially using stable electrical clock pulses. In a preferred embodiment they are semiconductor devices which accumulate charge for an entire line interval. This charge is transferred to a charged-coupled device or CCD array where it is read out in serial fashion while the charge from the next line is being stored. The number of elements in each line scanning array is determined by the resolution considerations. A luminance array should have between 300 and 500 elements for good resolution. A chrominance array has similar requirements in that the number of elements should be at least twice the number of color triads. Thus, for the conventional color bandwidth, we use between 100 and 200 color triads requiring at least 200 to 400 elements in the array for proper sampling of the resultant subcarrier. This results in a subcarrier frequency below the 3.58 MHz used in the U.S. broadcast standards. Both arrays are conveniently made identical since they alternately switch roles. In general two arrays of 400 elements each will provide a resultant image whose quality would be limited by the performance of an average color television receiver.

The system of FIG. 4 could be modified so as to be read out by frame scanners rather than line scanners. In this case, rather than use continuous motion, a system of rapid pulldown is used to rapidly advance the film a distance of one film frame and hold it for the time of one television field scan. Line scanners 54 and 55 are replaced by frame scanners such as television cameras. They scan the luminance and chrominance frames and then, following pulldown, switch 58 is thrown to reverse the roles of the cameras. In general this system will be more expensive, although not subject to the problem of non-uniform film velocity.

The problem of switching can be avoided by using a different encoding format similar to that described in previously described U.S. Pat. No. 3,535,992. Here, unlike FIG. 1, the film contains two picture tracks, one with a sequence of luminance frames and the other with a sequence of chrominance frames such as 12 and 14 in FIG. 2. The recording of this format is done in a fashion almost identical to the simultaneous system of FIG. 3. However, instead of the luminance and chrominance information being recorded on consecutive frames they are recorded side by side on adjacent tracks. Thus the film in FIG. 3 would be moving normal to the position shown. Each dual film contains the luminance and chrominance portions of each television field. Thus the system requires twice the total amount of film compared to the format of FIG. 1. The advantages of this system are that the switching function is avoided and that each line scan array can be optimally tailored to the luminance and chrominance information since they never switch functions. In addition, no timing discrepancies will exist between the luminance and chrominance information.

In U.S. Pat. No. 3,535,992, the encoded chrominance frame and luminance frame are read out using a cathode ray tube. Since these scanners experience scan velocity changes, a continuous half-frequency reference signal is recorded along with the chrominance frame. This makes the recording process much more difficult. This problem is avoided by using line scanners which are an array of discrete devices which are read out in serial fashion using a constant-frequency clock as with 54 and 55. In this arrangement scan velocity errors are not a consideration so that a synchronization stripe such as 15 in FIG. 1, can be used with each chrominance frame. This greatly facilitates the recording process and allows the encoding camera to be significantly simplified. The playback system is the same as that of FIG. 4 without switch 58. The line scanners 54 and 55 are placed in line so as to simultaneously scan the adjacent tracks and provide luminance signal 56 and encoded chrominance signal 57.

What is claimed is:
1. In a method for encoding color information onto black and white film the steps of:

exposing a first film frame to the color information to produce a luminance frame;

exposing a second film frame to the color information through a striped color filter which selectively transmits the three color primaries to produce a chrominance frame where the strips, when scanned, produce a carrier frequency lower than the standard broadcast subcarrier frequency;

marking the second film frame with color synchronization information wholly outside of the image region having a fixed spatial relationship to the striped color filter; and producing a sequence of exposed frames with alternate film frames representing luminance and chrominance images which are exposed in the same manner as the first and second film frames.

2. The method as recited in claim 1 including the additional steps of:

advancing the film a distance of one frame following each exposure at the television field rate; and inserting the striped color filter in the optical path between the color information and the film during the exposing of the chrominance frame.

3. The method as recited in claim 1 including the steps of:

advancing the film a distance of two frames followig each set of exposures at the television frame rate; and simultaneously imaging luminance and chrominance information on adjacent frames where the resultant film is read out with continuous motion using two line scanners alternately providing the luminance and chrominance information which either correspond to the color information at the same time interval or are separated in time by one television frame interval.

4. Apparatus for encoding color information onto black and white film comprising:

means for imaging the color information onto the black and white film;

means for exposing each alternate frame to the color information to produce a sequence of luminance frames;

means for exposing the remaining alternate frames to the color information through a striped color filter which selectively transmits the three color primaries to produce a sequence of chrominance frames where the stripes, when scanned, produce a carrier frequence lower than the standard broadcast subcarrier frequency; and means for marking the remaining alternate frames with color synchronization information wholly outside of the image region having a fixed spatial relationship to the striped color filter.

5. Apparatus as recited in claim 4 wherein the striped color filter consists of a sequence of the additive primary colors.

6. Apparatus as recited in claim 4 wherein the striped color filter consists of a sequence of the subtractive primary colors.

7. Apparatus as recited in claim 4 wherein the means for exposing the remaining alternate frames to the color information includes:

means for sequentially filtering the color information through the striped color filter and including means for advancing the film at a frame rate equal to the television field rate.

8. Apparatus as recited in claim 7 wherein the means for sequentially filtering the color information on alternate frames through the striped color filter includes means for moving the striped color filter adjacent to the film during the chrominance exposure interval and then removing it during the luminance exposure interval.

9. Apparatus as recited in claim 7 wherein the means for imaging the color information onto the black and white film includes an imaging lens and the means for sequentially filtering the color information through the striped color filter on alternate frames includes the striped color filter adjacent to the imaging lens and a cylindrical lens array adjacent to the film in an imaging relationship with the striped color filter and means for removing the cylindrical lens array from the film during the luminance exposure interval.

10. Apparatus as recited in claim 7 including diffuser means positioned between the imaging means and the stripd color filter for reducing the high frequency response of the color information on the alternate frames which represent the chrominance frames whereby the high frequency components of the color information are prevented from causing cross talk.

11. Apparatus as recited in claim 10 including means for moving the diffuser means out of the optical path during the exposure time of the luminance frame.

12. Apparatus as recited in claim 4 wherein the means for imaging the color information onto the black and white film includes means for simultaneously imaging the color information onto two adjacent film frames representing the luminance and chrominance frames and including means for advancing the film two frames at a time at a rate equal to the television frame rate where the resultant film is read out with continuous motion using two line scanners alternately providing the luminance and chrominance information which either correspond to the color information at the same time interval or are separated in time by one television frame interval.

13. Apparatus as recited in claim 12 including a light splitter for splitting the color information into two optical paths wherein the means for simultaneously imaging the color information onto two adjacent film frames includes a first imaging system for imaging the color information onto the luminance frame and a second imaging system for imaging the color information onto the chrominance frame and filtering the color information through the striped color filter.

14. Apparatus as recited in claim 13 wherein the striped color filter in the second imaging system is adjacent to the film.

15. Apparatus as recited in claim 14 wherein a diffuser is placed between the color information and the striped color filter whereby the high frequency components of the color information are prevented from causing cross talk.

16. Apparatus as recited in claim 13 wherein the second imaging system includes an imaging lens and the striped color filter is placed adjacent to the imaging lens and including a cylindrical lens array adjacent to the film in an imaging relationship with the striped color filter.

17. Apparatus as recited in claim 4 wherein the means for marking with color synchronization information includes means for exposing a vertical line on the film on the left side of each chrominance frame with the vertical line being a fixed distance from the image of the first color stripe of the striped color filter.

18. In a method for reading the color information from an encoded black and white film where alternate frames contain the luminance information and the remaining alternate frames contain the chrominance information which has been encoded by filtering the color information with a striped color filter and has color synchronization information wholly outside the image region with a fixed spatial relationship to the striped color filter the steps of:

scanning the film at television scan rates with a first scanner;

scanning the film at television scan rates with a second scanner which scans a region at a distance of one film frame from the region scanned by the first scanner;

deriving a luminance output signal from the scanner which is scanning the luminance frame and a chrominance output signal from the scanner which is scanning the chrominance frame;

deriving a synchronizing signal having a frequency less than the standard broadcast subcarrier frequency from the portion of the chrominance output signal produced by the synchronization information outside of the image region;

decoding the encoded chrominance signal using the synchronizing signal to provide decoded chrominance information; and generating a standard color television signal from the luminance output signal and the decoded chrominance information.

19. The method as recited in claim 18 including the additional step of uniformly translating the film at a rate of one film frame during the time of one television field.

20. Apparatus for deriving luminance and chrominance color television signals from an encoded black and white film where alternate frames contain luminance information and the remaining alternate frames contain chrominance information which has been encoded by filtering through a striped color filter and has color synchronization information wholly outside the image region with a fixed spatial relationship to the striped color filter comprising:

means for imaging a first line on the film onto a first scanner;

means for imaging a second line on the film separated by one film frame from the first line onto a second scanner;

first switching means for deriving the luminance signal from the output of the scanner which is scanning the frame containing luminance information;

second switching means for deriving the chrominance signal from the scanner which is scanning the frame containing chrominance information;

means for deriving color synchronization signal having a frequency less than the standard broadcast subcarrier frequency from the scanner which is scanning the frame containing chrominance information using the color synchronization information wholly outside the image region; and means for decoding the encoded chrominance signal to produce chrominance color television signals.

21. Apparatus as recited in claim 20 wherein the first and second scanners are line scanners and including means for uniformly translating the film at a rate of one film frame per television field time interval.

22. Apparatus as recited in claim 21 wherein the line scanners are each an array of charge-coupled devices.

23. Apparatus as recited in claim 21 wherein the means for imaging the first line on the film onto the first line scanner and the second line on the film onto the second line scanner is a single lens.

24. Apparatus as recited in claim 20 where the means for decoding includes two synchronous detectors each driven by decoding signals of different phases which decode the encoded chrominance signal and produce two color difference signals.

25. Apparatus as recited in claim 20 wherein the color synchronization information includes a vertical synchronization stripe at the left of each chrominance frame including means for detecting the synchronization stripe to produce a synchronization signal which controls a decoding signal.

26. Apparatus as recited in claim 25 wherein the synchronization signal controls the starting phase of the decoding signal during each scanning line.

27. Apparatus for storing color television information of a color image on a film where the resultant film is read out with continuous motion using two line scanners alternately providing luminance and chrominance information comprising a substitute in the form of a continuous film strip divided into a continuous array of frames where each alternate frame contains the luminance portion of the color television information and the remaining alternate frames contain the encoded chrominance portion of the color television information which has been encoded by filtering the color image with a striped color filter whose carrier frequency, when scanned, is less than the broadcast color subcarrier frequency and having color synchronization information wholly outside the color image with a fixed spatial relationship to the striped color filter.

28. Apparatus as recited in claim 27 wherein the consecutive frames represent information of the color image taken at the television field rate whereby the luminance and chrominance frames each represent information taken at the television frame rate.

29. Apparatus as recited in claim 27 wherein each pair of luminance and chrominance frames represents information of the color image taken at one time interval and each succeeding pair of luminance and chrominance frames represent information taken at time separations of one television frame interval.

30. In a method for encoding color information onto black and white film the steps of:

exposing a first film frame to the color information to produce a luminance frame;

positioning a striped color filter, whose carrier frequency, when scanned, is less than the broadcast color subcarrier frequency and which selectively transmits the three color primaries, at a fixed spatial relationship to the film frame whereby horizontal synchronization information derived from a side of the film frame can be used for color synchronization;

exposing a second film frame to the color information through the striped color filter to produce a chrominance frame; and producing a sequence of exposed frames with alternate film frames representing luminance and chrominance images which are exposed in the same manner as the first and second film frames.

31. Apparatus for encoding color information onto black and white film comprising:

means for imaging the color information onto the black and white film;

means for exposing each alternate frame to the color information to produce a sequence of luminance frames;

means for exposing the remaining alternate frames to the color information through a striped color filter which selectively transmits the three color primaries to produce a sequence of chrominance frames where the stripes, when scanned, produce a carrier frequency lower than the standard broadcast subcarrier frequency; and means for positioning the striped color filter at a fixed spatial relationship to the film frame whereby horizontal synchronization information derived from a side of the film frame can be used for color synchronization.

32. In a method for reading the color information from an encoded black and white film where alternate frames contain the luminance information and the remaining alternate frames contain the chrominance information which has been encoded by filtering the color information with a striped color filter having a fixed spatial relationship to the film frame the steps of:

scanning the film at television scan rates with a first scanner;

scanning the film at television scan rates with a second scanner which scans a region at a distance of one film frame from the region scanned by the first scanner;

deriving a luminance output signal from the scanner which is scanning the luminance frame;

deriving an encoded chrominance output signal from the scanner which is scanning the chrominance frame;

deriving a synchronizing signal having a frequency less than the standard broadcast subcarrier frequency from horizontal synchronization information derived from scanning a side of the chrominance frame; and decoding the encoded chrominance signal using the synchronizing signal to provide decoded chrominance information.

33. Apparatus for deriving luminance and chrominance color television signals from an encoded black and white film where alternate frames contain luminance information and the remaining alternate frames contain chrominance information which has been encoded by filtering through a striped color filter having a fixed spatial relationship to the film frame comprising:

means for imaging a first line on the film onto a first scanner;

means for imaging a second line on the film separated by one film frame from the first line onto a second scanner having a fixed spatial relationship to the film frame;

first switching means for deriving the luminance signal from the output of the scanner which is scanning the frame containing luminance information;

second switching means for deriving the encoded chrominance signal from the output of the scanner which is scanning the frame containing chrominance information;

means for deriving a color synchronization signal having a frequency less than the standard broadcast subcarrier frequency from horizontal synchronization information derived from scanning a side of the chrominance frame; and means for decoding the encoded chrominance signal using the color synchronization signal to provide the chrominance color television signal.

34. Apparatus for storing color television information of a color image on a film comprising a substrate in the form of a continuous film strip divided into a continuous array of frames where each alternate frame contains the luminance portion of the color television information and the remaining alternate frames contain the encoded chrominance portion of the color television information which has been encoded by filtering the color image with a striped color filter whose carrier frequency, when scanned, is less than the standard broadcast subcarrier frequency and having a fixed spatial relationship to the film frame whereby horizontal synchronization information derived from a side of the film frame can be used to provide color synchronizing signals for decoding the chrominance portion.

35. In a method for encoding color information onto black and white film the steps of:

exposing a first film frame to the color information to produce a luminance frame;

exposing a second film frame to the color information through a striped color filter which selectively transmits the three color primaries to produce a chrominance frame;

producing a sequence of exposed frames with alternate film frames representing luminance and chrominance images which are exposed in the same manner as the first and second film frames;

advancing the film a distance of two frames following each set of exposures at the television frame rate;

simultaneously imaging luminance and chrominance information on adjacent frames; and alternately blocking the luminance and chrominance images at the television field rate whereby the consecutive film frames are exposed at the television field rate.

36. Apparatus for encoding color information onto black and white film comprising:

means for imaging the color information onto the black and white film;

means for exposing each alternate frame to the color information to produce a sequence of luminance frames;

means for exposing the remaining alternate frames to the color information through a striped color filter which selectively transmits the three color primaries to produce a sequence of chrominance frames;

means for simultaneously imaging the color information onto two adjacent film frames representing the luminance and chrominance frames;

means for advancing the film two frames at a time at a rate equal to the television frame rate; and means for alternately blocking the color information from the luminance and chrominance frames at the television field rate whereby the consecutive film frames are exposed at the television field rate.

37. Apparatus for encoding color information onto black and white film comprising:

means for simultaneously imaging the color information onto two adjacent film frames representing luminance and chrominance frames including a light splitter for splitting the color information into two optical paths and a first imaging system for imaging the color information onto the luminance frame and a second imaging system for imaging the color information onto the chrominance frame including an imaging lens and a striped color filter which selectively transmits the three color primaries placed adjacent to the imaging lens and including a cylindrical lens array adjacent to the film in an imaging relationship with the striped color filter;

means for advancing the film two frames at a time at a rate equal to the television frame rate;

means for exposing each alternate frame to the color information to produce a sequence of luminance frames;

means for exposing the remaining alternate frames to the color information through the striped color filter which selectively transmits the three color primaries to produce a sequence of chrominance frames; and means for marking the remaining alternate frames with color synchronization information wholly outside of the image region having a fixed spatial relationship to the striped color filter.

* * * * *